(12) United States Patent
Kim et al.

(10) Patent No.: US 7,995,671 B2
(45) Date of Patent: Aug. 9, 2011

(54) MULTIPLE-INPUT MULTIPLE-OUTPUT (MIMO) TRANSMISSION WITH RANK-DEPENDENT PRECODING

(75) Inventors: Byoung-Hoon Kim, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 753 days.

(21) Appl. No.: 12/027,921

(22) Filed: Feb. 7, 2008

(65) Prior Publication Data
US 2008/0192849 A1    Aug. 14, 2008

Related U.S. Application Data

(60) Provisional application No. 60/889,255, filed on Feb. 9, 2007.

(51) Int. Cl.
*H04B 7/02* (2006.01)
(52) U.S. Cl. ........................................................ 375/267
(58) Field of Classification Search .................. 375/267; 455/132
See application file for complete search history.

(56) References Cited

U.S. PATENT DOCUMENTS

| | | | |
|---|---|---|---|
| 6,862,271 B2 | 3/2005 | Medvedev et al. | |
| 2004/0002364 A1 | 1/2004 | Trikkonen et al. | |
| 2006/0067421 A1 | 3/2006 | Walton et al. | |
| 2007/0099578 A1* | 5/2007 | Adeney et al. | 455/69 |
| 2007/0191066 A1* | 8/2007 | Khojastepour et al. | 455/562.1 |
| 2008/0186934 A1* | 8/2008 | Khan et al. | 370/342 |
| 2008/0187030 A1* | 8/2008 | Khan | 375/219 |
| 2008/0188190 A1* | 8/2008 | Prasad et al. | 455/114.3 |
| 2008/0247364 A1* | 10/2008 | Kim et al. | 370/336 |

OTHER PUBLICATIONS

International Search Report, PCT/US08/053512, International Search Authority, European Patent Office, Oct. 29, 2008.
Written Opinion, PCT/US08/053512, International Search Authority, European Patent Office, Oct. 29, 2008.

* cited by examiner

*Primary Examiner* — Juan A Torres
(74) *Attorney, Agent, or Firm* — Eric Ho; Kenyon S. Jenckes

(57) ABSTRACT

Techniques for performing rank-dependent precoding for a multiple-input multiple-output (MIMO) transmission are described. Each rank may be associated with a set of at least one precoding vector or matrix that can provide good performance for that rank. A transmitter may obtain a precoding vector for a rank-1 transmission from a first set containing at least one column vector of a unitary matrix, e.g., a Fourier matrix. The transmitter may perform precoding for the rank-1 transmission based on the precoding vector. The transmitter may obtain a precoding matrix for a rank-2 transmission from a second set containing an identity matrix. The transmitter may perform precoding for the rank-2 transmission based on the precoding matrix. For the rank-2 transmission, the transmitter may select the identity matrix as the precoding matrix if a MIMO channel resembles a diagonal channel (which may be determined based on antenna configurations) and may select the unitary matrix otherwise.

22 Claims, 6 Drawing Sheets

MULTIPLE-INPUT MULTIPLE-OUTPUT (MIMO) TRANSMISSION WITH RANK-DEPENDENT PRECODING

The present application claims priority to provisional U.S. Application Ser. No. 60/889,255, entitled "MULTIPLE INPUT MULTIPLE OUTPUT ANTENNA METHODS AND DEVICES," filed Feb. 9, 2007, assigned to the assignee hereof and incorporated herein by reference.

BACKGROUND

I. Field

The present disclosure relates generally to communication, and more specifically to techniques for transmitting data in a wireless communication system.

II. Background

Wireless communication systems are widely deployed to provide various communication content such as voice, video, packet data, messaging broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may support multiple-input multiple-output (MIMO) transmission. For MIMO, a transmitter may utilize multiple (T) transmit antennas for data transmission to a receiver equipped with multiple (R) receive antennas. The multiple transmit and receive antennas form a MIMO channel that may be used to increase throughput and/or improve reliability. For example, the transmitter may transmit up to T data streams simultaneously from the T transmit antennas to improve throughput. Alternatively, the transmitter may transmit a single data stream from all T transmit antennas to improve reliability. In any case, it is desirable to send a MIMO transmission in a manner to achieve good performance.

SUMMARY

Techniques for performing rank-dependent precoding for a MIMO transmission are described herein. Precoding may include processing with a precoding vector or matrix to send L data streams on L virtual antennas formed by T physical antennas, where in general $1 \leq L \leq T$. L may also be considered as the rank of a MIMO channel. For rank-dependent precoding, each rank may be associated with a set of at least one precoding vector or matrix that can provide good performance for that rank. Different ranks may be associated with different sets of precoding vectors or matrices.

In one design, a transmitter (e.g., a Node B) may obtain a precoding vector for a rank-1 transmission from a first set containing at least one column vector of a unitary matrix. The unitary matrix may be a Fourier matrix, a phase-shifted Fourier matrix, or some other matrix having orthogonal columns. The transmitter may perform precoding for the rank-1 transmission based on the precoding vector. The transmitter may obtain a precoding matrix for a rank-2 transmission from a second set containing an identity matrix having ones along the diagonal and zeros elsewhere. The transmitter may perform precoding for the rank-2 transmission based on the precoding matrix.

In one design, the transmitter may determine whether the MIMO channel resembles a diagonal channel, which has a channel response matrix with small channel gains off the diagonal. This determination may be based on antenna configurations at the transmitter and receiver. The transmitter may select the identity matrix as the precoding matrix for the rank-2 transmission if the MIMO channel resembles a diagonal channel. The second set may further include the unitary matrix. The transmitter may select the unitary matrix as the precoding matrix for the rank-2 transmission if the MIMO channel does not resemble a diagonal channel.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other CDMA variants. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). These various radio technologies and standards are known in the art.

Figure 1:
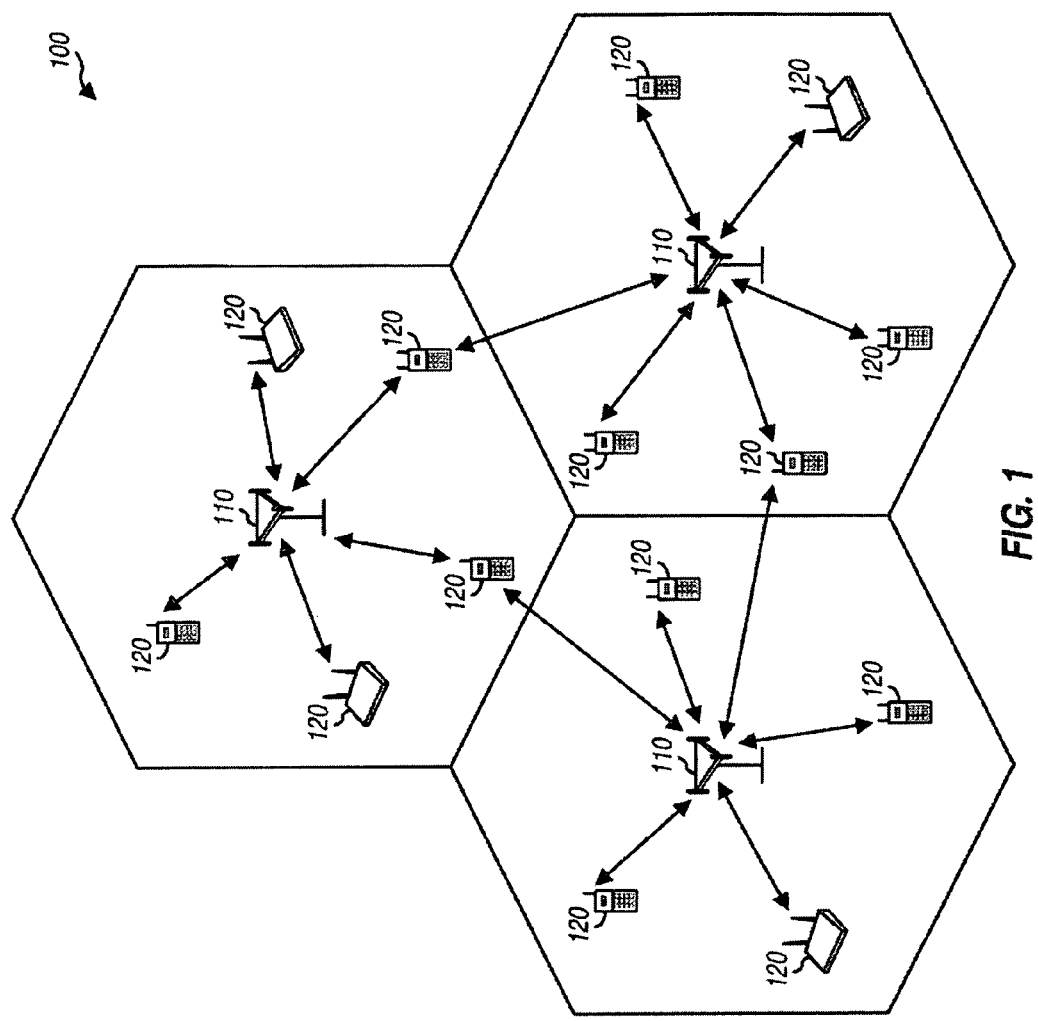
FIG. 1 shows a wireless multiple-access communication system.

FIG. 1 shows a wireless multiple-access communication system 100 with multiple Node Bs 110 and multiple UEs 120. A Node B may be a fixed station that communicates with the UEs and may also be referred to as an evolved Node B (eNB), a base station, an access point, etc. Each Node B 110 provides communication coverage for a particular geographic area. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmission on the downlink and uplink. The downlink (or forward link) refers to the communication link from the Node Bs to the UEs, and the uplink (or reverse link) refers to the communication link from the UEs to the Node Bs.

Figure 2:
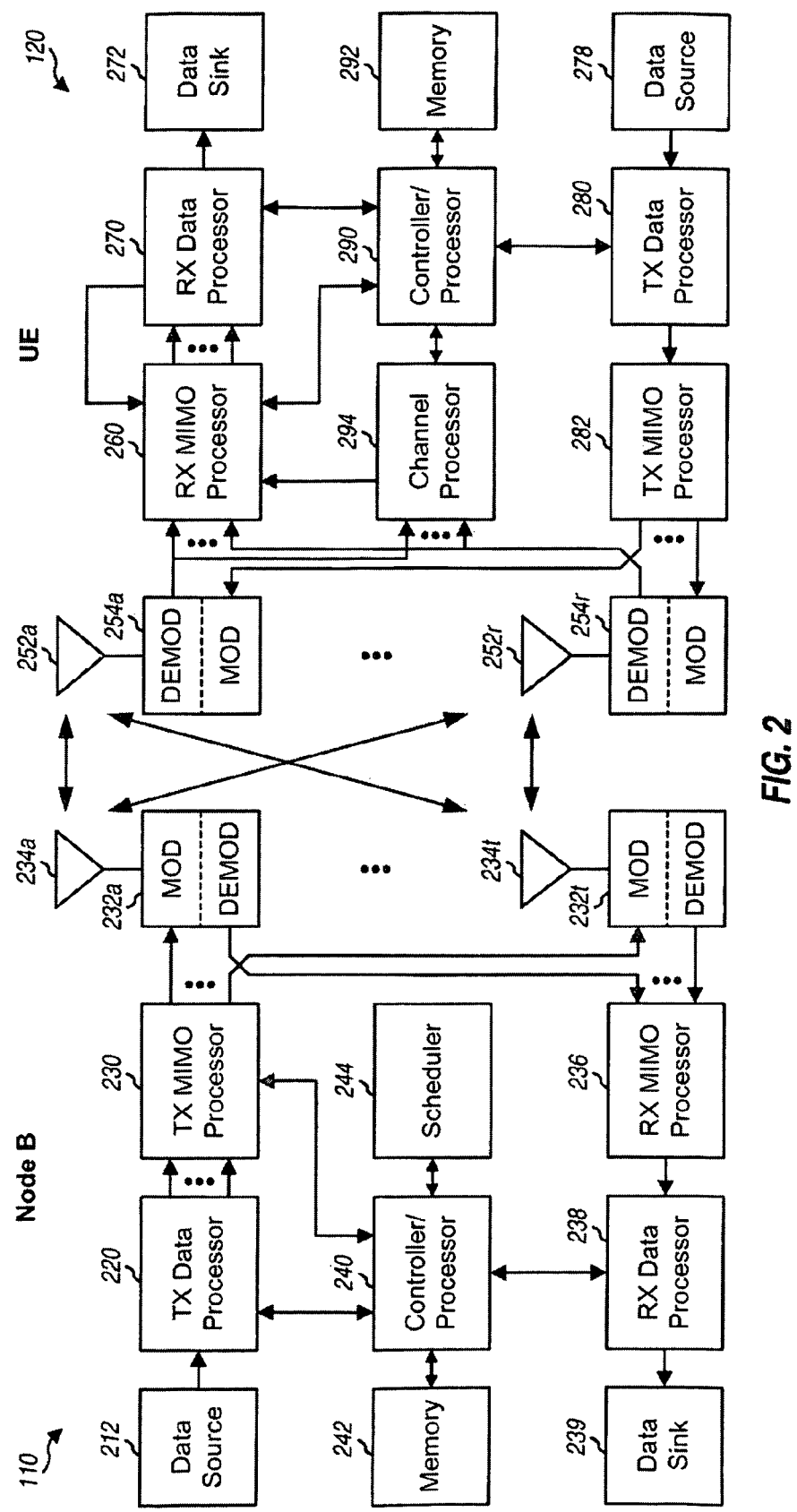
FIG. 2 shows a block diagram of a Node B and a user equipment (UE).

FIG. 2 shows a block diagram of a design of a Node B 110 and a UE 120, which are one of the Node Bs and one of the UEs in FIG. 1. Node B 110 is equipped with multiple (T) antennas 234a through 234t. UE 120 is equipped with multiple (R) antennas 252a through 252r. Each of antennas 234 and 252 may be considered as a physical antenna.

At Node B 110, a TX data processor 220 may receive data from a data source 212, process (e.g., encode and symbol map) the data based on one or more modulation and coding schemes, and provide data symbols. As used herein, a data symbol is a symbol for data, a pilot symbol is a symbol for pilot, and a symbol may be a real or complex value. The data and pilot symbols may be modulation symbols from a modulation scheme such as PSK or QAM. Pilot is data that is known a priori by both the Node B and UE. A TX MIMO processor 230 may process the data and pilot symbols as described below and provide T output symbol streams to T modulators (MOD) 232a through 232t. Each modulator 232 may process its output symbol stream (e.g., for OFDM) to obtain an output sample stream. Each modulator 232 may further condition (e.g., convert to analog, filter, amplify, and upconvert) its output sample stream and generate a downlink signal. T downlink signals from modulators 232a through 232t may be transmitted via antennas 234a through 234t, respectively.

At UE 120, R antennas 252a through 252r may receive the T downlink signals from Node B 110, and each antenna 252 may provide a received signal to an associated demodulator (DEMOD) 254. Each demodulator 254 may condition (e.g., filter, amplify, downconvert, and digitize) its received signal to obtain samples and may further process the samples (e.g., for OFDM) to obtain received symbols. Each demodulator 254 may provide received data symbols to an RX MIMO processor 260 and provide received pilot symbols to a channel processor 294. Channel processor 294 may estimate the response of the MIMO channel from Node B 110 to UE 120 based on the received pilot symbols and provide a MIMO channel estimate to RX MIMO processor 260. RX MIMO processor 260 may perform MIMO detection on the received data symbols based on the MIMO channel estimate and provide detected symbols, which are estimates of the transmitted data symbols. An RX data processor 270 may process (e.g., symbol demap and decode) the detected symbols and provide decoded data to a data sink 272.

UE 120 may evaluate the channel conditions and generate feedback information, which may comprise various types of information as described below. The feedback information and data from a data source 278 may be processed (e.g., encoded and symbol mapped) by a TX data processor 280, spatially processed by a TX MIMO processor 282, and further processed by modulators 254a through 254r to generate R uplink signals, which may be transmitted via antennas 252a through 252r. At Node B 110, the R uplink signals from UE 120 may be received by antennas 234a through 234t, processed by demodulators 232a through 232t, spatially processed by an RX MIMO processor 236, and further processed (e.g., symbol demapped and decoded) by an RX data processor 238 to recover the feedback information and data sent by UE 120. The decoded data may be provided to a data sink 239. A controller/processor 240 may control data transmission to UE 120 based on the feedback information.

Controllers/processors 240 and 290 may direct the operation at Node B 110 and UE 120, respectively. Memories 242 and 292 may store data and program codes for Node B 110 and UE 120, respectively. A scheduler 244 may select UE 120 and/or other UEs for data transmission on the downlink and/or uplink based on the feedback information received from all UEs.

The techniques described herein may be used for MIMO transmission on the downlink as well as the uplink. For clarity, certain aspects of the techniques are described below for MIMO transmission on the downlink in LTE. LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. LTE uses localized frequency division multiplexing (LFDM), which is a variant of SC-FDM, for the uplink. With LFDM, modulation symbols are sent on a block of consecutive subcarriers.

Node B 110 may transmit L data symbols simultaneously via L layers on each subcarrier in each symbol period, where in general $L \geq 1$. A layer may correspond to one spatial dimension for each subcarrier used for transmission. Node B 110 may transmit data using various MIMO transmission schemes.

In one design, Node B 110 may process data symbols for each subcarrier k as follows:

$$x(k) = WUd(k), \qquad \text{Eq (1)}$$

where d(k) is an L×1 vector containing L data symbols to be sent via L layers on subcarrier k in one symbol period, U is an L×L permutation matrix, W is a T×L precoding matrix, and x(k) is a T×1 vector containing T output symbols for the T transmit antennas on subcarrier k in one symbol period.

Equation (1) is for one subcarrier k. The same processing may be performed for each subcarrier used for transmission. In the description herein, a matrix may have one or multiple columns.

The preceding matrix W may be used to form up to T virtual antennas with T physical antennas 234a through 234t at Node B 110. Each virtual antenna may be formed with one column of W. A data symbol may be multiplied by one column of W and may then be sent on one virtual antenna and all T physical antennas. W may be determined as described below.

The permutation matrix U may be used to map the data symbols for the L layers to L virtual antennas selected from the T available virtual antennas. U may be defined based on a layer to virtual antenna mapping selected for use. U may also be an identity matrix I. The same or different permutation matrices may be used for the K subcarriers.

In general, Node B 110 may perform precoding based on one or more matrices. Precoding may include virtual antenna, signaling, which is processing with the preceding matrix W to obtain virtual antennas. Precoding may also include processing with one or more cyclic delay matrices for each subcarrier to obtain cyclic delay diversity. For simplicity, much of the following description assumes that preceding includes only virtual antenna signaling with the precoding matrix W.

Figure 3:
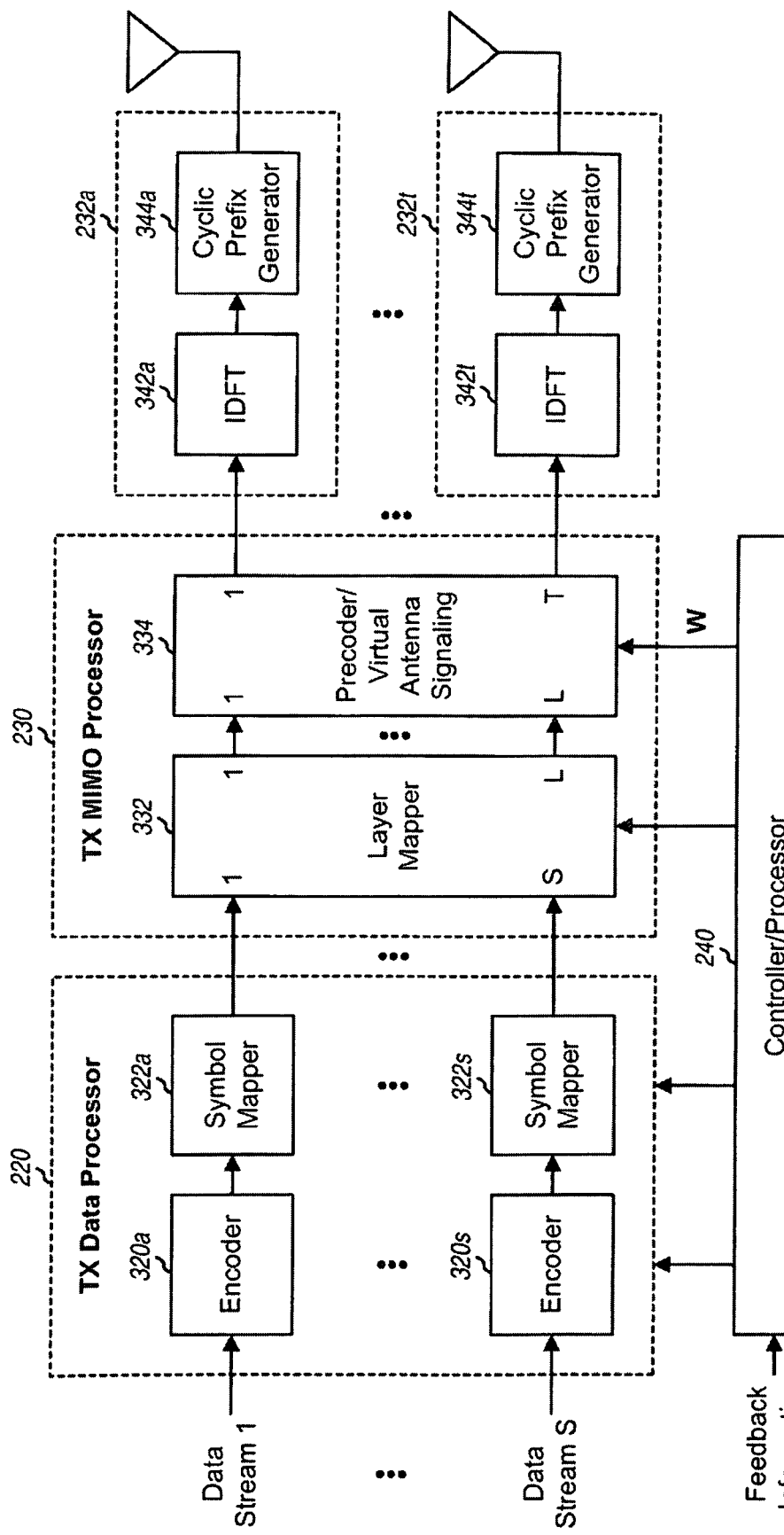
FIG. 3 shows a block diagram of a transmit (TX) data processor and a TX MIMO processor.

FIG. 3 shows a block diagram of a design of TX data processor 220, TX MIMO processor 230, and modulators 232a through 232t at Node B 110 in FIG. 2. Within TX data processor 220, S data streams may be provided to S encoders 320a through 320s, where in general S≧1. Each encoder 320 may encode, interleave, and scramble its data stream and provide coded data to an associated symbol mapper 322. Each symbol mapper 322 may map its coded data to data symbols. Each data stream may carry one transport block or packet in each transmission time interval (TTI). Each encoder 320 may process its transport block to obtain a codeword. The terms "data stream", "transport block", "packet", and "codeword" may be used interchangeably. Symbol mappers 322a through 322s may provide S data symbol streams.

Within TX MIMO processor 230, a layer mapper 332 may map the data symbols for the S data streams to L virtual antennas selected for use. In one design, mapper 332 may map the data symbols for the S data streams to L layers and may then map the data symbols for the L layers to subcarriers and virtual antennas used for transmission. A precoder/virtual antenna signaling unit 334 may multiply the mapped symbols from layer mapper 332 for each subcarrier with the precoding matrix W to obtain output symbols for that subcarrier. Pilot symbols may be multiplexed at the input of output of precoder 334. Precoder 334 may provide T output symbol streams to T modulators 232a through 232t.

Each modulator 232 may perform OFDM modulation for a respective output symbol stream. Within each modulator 232, an inverse discrete Fourier transform (IDFT) unit 342a-t may perform a K-point IDFT on K output symbols to be sent on the K total subcarriers in an OFDM symbol period to obtain a useful portion containing K time-domain samples. Each time-domain sample is a complex value to be transmitted in one sample period. A cyclic prefix generator 344a-t may copy the last C samples of the useful portion and append the copied samples to the front of the useful portion to form an OFDM symbol containing K+C samples. The copied portion is referred to as a cyclic prefix and is used to combat inter-symbol interference (ISI) caused by frequency selective fading. Each modulator 232 may further condition its sample stream (not shown in FIG. 3) to generate a downlink signal.

Controller/processor 240 may receive feedback information from UE 120 and generate controls for TX data processor 220 and TX MIMO processor 230. Controller/processor 240 may also provide the precoding matrix W to precoder 334.

TX data processor 280, TX MIMO processor 282, and modulators 254 at UE 120 in FIG. 2 may be implemented in similar manner as TX data processor 220, TX MIMO processor 230, and modulators 232, respectively, in FIG. 3. For LFDM, a discrete Fourier transform (DFT) unit may be inserted after each symbol mapper 322 and may be used to transform the data symbols from time domain to frequency domain. For OFDM, the DFT unit may be omitted as shown in FIG. 3.

The received symbols at UE 120 for each subcarrier k may be expressed as:

$$y(k) = H(k)x(k) + z(k) \qquad \text{Eq (2)}$$
$$= H(k)WUd(k) + z(k)$$
$$= H_{eff}(k)Ud(k) + z(k),$$

where
$H(k)$ is an R×T MIMO channel matrix for subcarrier k,
$H_{eff}(k)=H(k)W$ is an R×L effective MIMO channel matrix for subcarrier k,
$y(k)$ is an R×1 vector containing R received symbols on subcarrier k, and
$z(k)$ is an R×1 noise vector for subcarrier k.

UE 120 may compute a spatial filter matrix M(k) for each subcarrier k based on the MIMO channel matrix H(k) and the precoding matrix W and in accordance with a linear minimum mean square error (MMSE) technique, as follows:

$$M(k)=D(k)[H_{eff}^H(k)H_{eff}(k)+\sigma_z^2 I]^{-1}H_{eff}^H(k), \qquad \text{Eq (3)}$$

where
$D(k)=[\text{diag}\{[H_{eff}^H(k)H_{eff}(k)+\sigma_z^2 I]^{-1}H_{eff}^H H_{eff}(k)\}]^{-1}$ is a diagonal matrix of scaling values used to obtain normalized detected symbols,
$\sigma_z^2$ is the variance of the noise, and
$M(k)$ is an R×L spatial filter matrix for subcarrier k.

UE 120 may perform MIMO detection as follows:

$$U\hat{d}(k)=M(k)y(k)=Ud(k)+\tilde{z}(k), \qquad \text{Eq (4)}$$

where
$\hat{d}(k)$ is an L×1 vector containing L detected symbols for subcarrier k, and
$\tilde{z}(k)$ is a noise vector after the MIMO detection.

Figure 4:
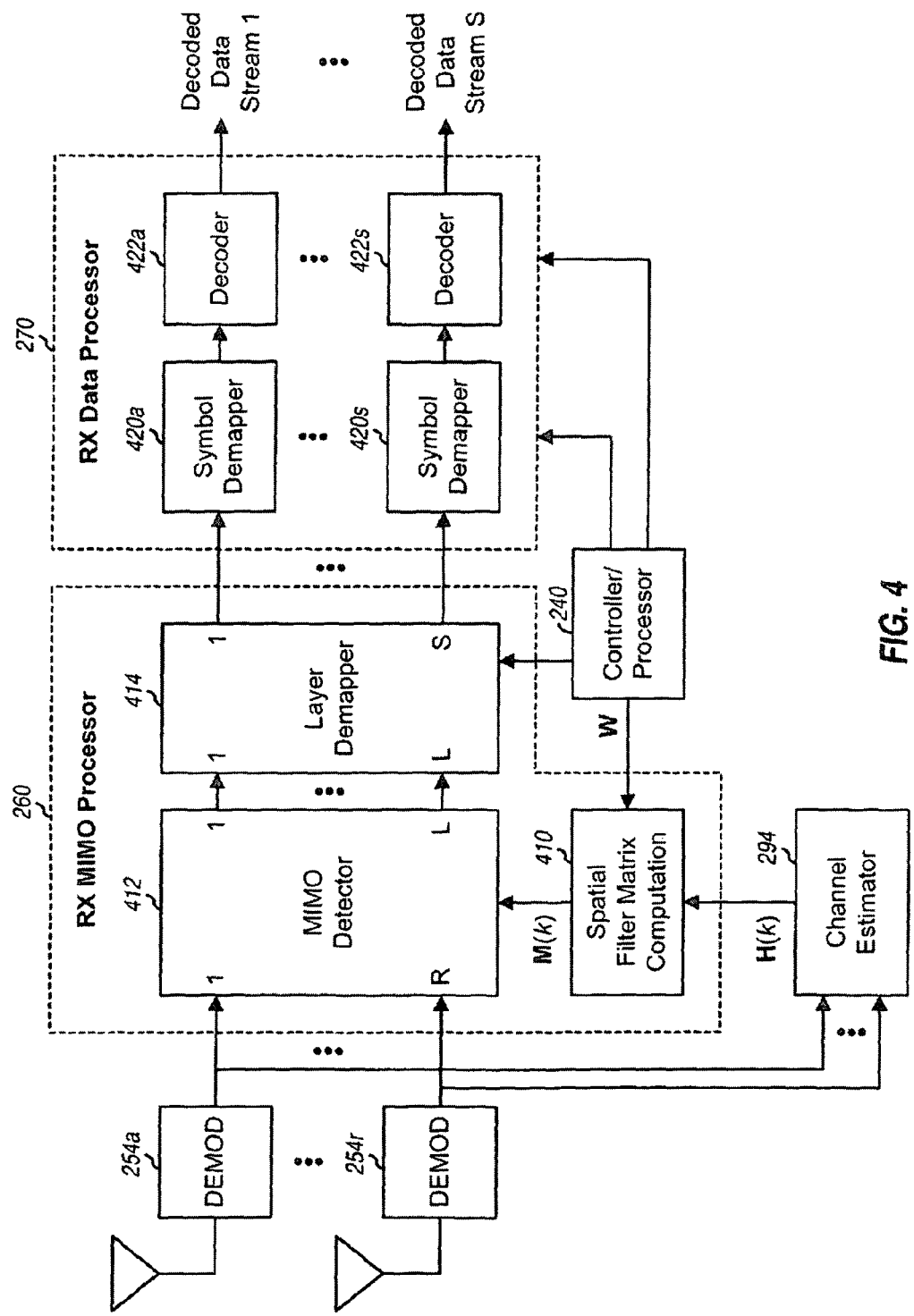
FIG. 4 shows a block diagram of a receive (RX) MIMO processor and an RX data processor.

FIG. 4 shows a block diagram of a design of RX MIMO processor 260 and RX data processor 270 at UE 120 in FIG. 2. Channel estimator 294 may derive a MIMO channel estimate H(k) based on the received pilot symbols from demodulators 254a through 254r. Within RX MIMO processor 260, a computation unit 410 may compute a spatial filter matrix M(k) for each subcarrier k as shown in equation (3) or based on some other MIMO detection technique. A MIMO detector 412 may perform MIMO detection on R received data symbol streams from R demodulators 254a through 254r with the spatial filter matrix M(k) for each subcarrier k as shown in equation (4) and provide detected symbols for the L selected virtual antennas. A layer demapper 414 may demap the detected symbols in a manner complementary to the mapping performed by layer mapper 332 in FIG. 3 and may provide S detected symbol streams for the S data streams.

Within RX data processor 270, S symbol demappers 420a through 420s may symbol demap the S detected symbol streams and provide log-likelihood ratios (LLRs). S decoders 422a through 422s may descramble, deinterleave, and decode the LLRs from symbol demappers 420a through 420s, respectively, and provide S decoded data streams.

FIG. 4 shows a linear MMSE receiver. For a linear MMSE with successive interference cancellation (MMSE-SIC) receiver, one data stream may be detected and decoded, and the interference due to this stream may be estimated and canceled from the received data symbols. Another data stream may then be detected and decoded after cancellation of the interference due to the decoded stream.

Various types of matrices may be used for the precoding matrix W. In one design, a T×T unitary matrix V is used for the precoding matrix W. The unitary matrix V is characterized by the properties $V^H V=I$ and $VV^H=I$, which means that the columns of V are orthogonal to one another, the rows of V are also orthogonal to one another, and each column and each row has unit power. The unitary matrix V may be defined such that all elements of the matrix are unit-magnitude elements having the same magnitude. The use of the unitary matrix V with unit-magnitude elements for the preceding matrix W may (i) allow all T transmit antennas and their associated power amplifiers to be fully utilized for data transmission regardless of the number of layers and (ii) avoid affecting the channel statistics, which may be unknown to the transmitter.

In one design, a Fourier, matrix F, which is a unitary matrix with unit-magnitude elements, may be used for the preceding matrix W. The elements of a T×T Fourier matrix F may be expressed as:

$$f_{u,v} = e^{-j2\pi \frac{u \cdot v}{T}}, \quad \text{Eq (5)}$$

for $u = 0, \ldots, T-1$ and $v = 0, \ldots, T-1$, where $f_{u,v}$ is the element in the u-th row and v-th column of the Fourier matrix. A Fourier matrix is also commonly referred to as a DFT matrix.

In another design, a phase-shifted Fourier matrix, which is also a unitary matrix with unit-magnitude elements, may be used for the precoding matrix W. The phase-shifted Fourier matrix may be expressed as:

$$W = \Lambda F, \quad \text{Eq (6)}$$

$$\text{where } \Lambda = \begin{bmatrix} e^{j\theta_1} & 0 & \cdots & 0 \\ 0 & e^{j\theta_2} & \cdots & 0 \\ \vdots & \vdots & \ddots & \vdots \\ 0 & 0 & \cdots & e^{j\theta_T} \end{bmatrix}$$

is a diagonal phase shift matrix, and $\theta_v$ is the phase for the v-th antenna.

A diagonal matrix is a matrix with possible non-zero elements along the diagonal and zero elements elsewhere. As shown in equation (6), the phase-shifted Fourier matrix may be obtained by pre-multiplying the Fourier matrix with a diagonal matrix.

Precoding with a unitary matrix as shown in equation (1) may allow each data symbol to be transmitted via all T physical antennas and may also allow the associated power amplifiers to be used for data transmission even when only one data symbol is sent on one layer. Furthermore, each data symbol may be sent from all T physical antennas regardless of the number of layers and may observe spatial diversity.

The response of the MIMO channel from the T transmit antennas at Node B 110 to the R receive antennas at UE 120 may be expressed as:

$$H(k) = \begin{bmatrix} h_{11}(k) & h_{12}(k) & \cdots & h_{1T}(k) \\ h_{21}(k) & h_{22}(k) & \cdots & h_{2T}(k) \\ \vdots & \vdots & \ddots & \vdots \\ h_{R1}(k) & h_{R2}(k) & \cdots & h_{RT}(k) \end{bmatrix}, \quad \text{Eq (7)}$$

where $h_{ij}(k)$ is a complex channel gain from transmit antenna j to receive antenna i for subcarrier k.

The characteristics of the complex channel gains in H(k) may be dependent on various factors such as the wireless environment, the type of antennas used at Node B 110, the type of antennas used at UE 120, etc. If an antenna configuration such as a uniform linear array (ULA) is used at Node B 110, then the complex channel gains may be uncorrelated, and precoding with a unitary matrix may achieve spatial diversity. However, if cross-polarization antenna configurations are used at Node B 110 and UE 120, then cross-polarization discrimination (XPD) of the MIMO channel may be increased. When the XPD is high, the MIMO channel matrix H(k) may come close to a diagonal matrix, and precoding with a unitary matrix may make the effective MIMO channel matrix $H_{eff}(k)$ far from the diagonal matrix.

UE 120 may employ a linear MMSE receiver, an MMSE-SIC receiver, or some other MIMO receiver to process the received symbols y(k). The linear MMSE receiver can perform linear MMSE detection on the received symbols to obtain detected symbols for all streams, which may be processed to recover the data sent in these streams. The MMSE-SIC receiver can perform linear MMSE detection and decoding for one stream at a time, estimate the interference due to each decoded stream, and cancel the estimated interference prior to performing MMSE detection and decoding for the next stream. The MMSE-SIC receiver may be able to achieve good performance regardless of whether the effective MIMO channel is diagonal or non-diagonal. However, the linear MMSE receiver may have worse performance for a non-diagonal effective MIMO channel. Thus, precoding with a unitary matrix in the presence of a near-diagonal MIMO channel matrix H(k) may degrade the performance of the linear MMSE receiver.

In an aspect, rank-dependent precoding may be performed in order to provide good performance for both the linear MMSE receiver and the MMSE-SIC receiver. For rank-dependent precoding, each rank may be associated with a set of at least one precoding vector or matrix that can provide good performance for that rank. Different ranks may be associated with different sets of precoding vectors or matrices. Rank-dependent precoding may provide good performance even when the Node B is equipped with cross-polarization antennas.

For clarity, rank-dependent precoding is described below for a 2×2 MIMO configuration with two transmit antennas and two receive antennas. For simplicity, the following description is for one subcarrier, and subcarrier index k is omitted. Also for simplicity, U is assumed to be an identity matrix and is omitted. For the 2×2 MIMO configuration, the received symbols at the UE may be expressed as:

$$\begin{bmatrix} y_1 \\ y_2 \end{bmatrix} = \begin{bmatrix} h_{11} & h_{12} \\ h_{21} & h_{22} \end{bmatrix} \begin{bmatrix} x_1 \\ x_2 \end{bmatrix} + \begin{bmatrix} z_1 \\ z_2 \end{bmatrix}. \quad \text{Eq (8)}$$

The MIMO channel matrix may resemble a diagonal matrix if the XPD is very high. For a case of almost diagonal MIMO channel, the MIMO channel matrix may be expressed as:

$$H = \begin{bmatrix} h_{11} & h_{12} \\ h_{21} & h_{22} \end{bmatrix} \approx \begin{bmatrix} \alpha & 0 \\ 0 & \beta \end{bmatrix}, \quad \text{Eq (9)}$$

where $\alpha$ and $\beta$ are complex channel gains. The near-diagonal MIMO channel matrix in equation (9) may be obtained, e.g., when the Node B and the UE are both equipped with cross-polarization antennas.

For a rank-2 transmission using a 2×2 Fourier matrix $$F = \frac{1}{\sqrt{2}} \begin{bmatrix} 1 & 1 \\ 1 & -1 \end{bmatrix}$$

as the precoding matrix W, the output symbols at the Node B and the received symbols at the UE may be expressed as:

$$\begin{bmatrix} x_1 \\ x_2 \end{bmatrix} = \frac{1}{\sqrt{2}} \begin{bmatrix} 1 & 1 \\ 1 & -1 \end{bmatrix} \begin{bmatrix} d_1 \\ d_2 \end{bmatrix}, \text{ and} \qquad \text{Eq (10)}$$

$$\begin{bmatrix} y_1 \\ y_2 \end{bmatrix} = \frac{1}{\sqrt{2}} \begin{bmatrix} \alpha & \alpha \\ \beta & -\beta \end{bmatrix} \begin{bmatrix} d_1 \\ d_2 \end{bmatrix} + \begin{bmatrix} z_1 \\ z_2 \end{bmatrix}. \qquad \text{Eq (11)}$$

Equation (11) may be expressed as:

$$y_1 = \frac{1}{\sqrt{2}}(\alpha \cdot d_1 + \alpha \cdot d_2) + z_1 \qquad \text{Eq (12)}$$

and $$y_2 = \frac{1}{\sqrt{2}}(\beta \cdot d_1 - \beta \cdot d_2) + z_2.$$

As shown in equation (12), precoding with the Fourier matrix may degrade the performance of the rank-2 transmission due to increased spatial interference if the UE employs a linear MMSE receiver, unless a $|\alpha|=|\beta|$. If the UE employs an MMSE-SIC receiver, then precoding with the Fourier matrix may not degrade performance (ideally).

For a rank-2 transmission using the identity matrix as the precoding matrix W, or W=I, the output symbols at the Node B and the received symbols at the UE may be expressed as:

$$\begin{bmatrix} x_1 \\ x_2 \end{bmatrix} = \frac{1}{\sqrt{2}} \begin{bmatrix} 1 & 1 \\ 1 & -1 \end{bmatrix} \begin{bmatrix} d_1 \\ d_2 \end{bmatrix}, \text{ and} \qquad \text{Eq (13)}$$

$$\begin{bmatrix} y_1 \\ y_2 \end{bmatrix} = \frac{1}{\sqrt{2}} \begin{bmatrix} \alpha & 0 \\ 0 & \beta \end{bmatrix} \begin{bmatrix} d_1 \\ d_2 \end{bmatrix} + \begin{bmatrix} z_1 \\ z_2 \end{bmatrix}. \qquad \text{Eq (14)}$$

Equation (14) may be expressed as:

$$y_1 = \frac{1}{\sqrt{2}} \alpha \cdot d_1 + z_1 \qquad \text{Eq (15)}$$

and $$y_2 = \frac{1}{\sqrt{2}} \beta \cdot d_2 + z_2.$$

As shown in equation (15), precoding with the identity matrix may result in little or no spatial interference when the MIMO channel matrix is nearly diagonal. This may provide good rank-2 performance for both the linear MMSE receiver as well as the MMSE-SIC receiver. The identity matrix may thus be preferred over the Fourier matrix for rank-2 transmission with near-diagonal MIMO channel matrix.

For a rank-1 transmission using one column of the Fourier matrix F as the precoding matrix W, the output symbols at the Node B and the received symbols at the UE may be expressed as:

$$\begin{bmatrix} x_1 \\ x_2 \end{bmatrix} = \frac{1}{\sqrt{2}} \begin{bmatrix} 1 \\ \pm 1 \end{bmatrix} d, \text{ and} \qquad \text{Eq (16)}$$

$$\begin{bmatrix} y_1 \\ y_2 \end{bmatrix} = \frac{1}{\sqrt{2}} \begin{bmatrix} \alpha \\ \pm \beta \end{bmatrix} d + \begin{bmatrix} z_1 \\ z_2 \end{bmatrix}. \qquad \text{Eq (17)}$$

The $\pm$ sign in equations (16) and (17) is dependent on whether the first or second column of the Fourier matrix is used as the precoding vector.

Equation (17) may be expressed as:

$$y_1 = \frac{1}{\sqrt{2}} \alpha \cdot d + z_1 \qquad \text{Eq (18)}$$

and $$y_2 = \pm \frac{1}{\sqrt{2}} \beta \cdot d + z_2.$$

As shown in equation (18), precoding with a column of the Fourier matrix for rank-1 transmission may improve performance since the UE can obtain a combined channel power of $(|\alpha|^2|\beta|^2)/2$, thereby fully utilizing the power radiated from two power amplifiers for two transmit antennas at the Node B.

For a rank-1 transmission using the left column of the identity matrix as the precoding matrix W, the received symbols at the UE may be expressed as:

$$y_1 = \frac{1}{\sqrt{2}} \alpha \cdot d + z_1 \qquad \text{Eq (19)}$$

and $$y_2 = z_2.$$

If the right column of the identity matrix is used as the precoding matrix W, then the received symbols at the UE may be expressed as:

$$y_1 = z_1 \qquad \text{Eq (20)}$$

and $$y_2 = \frac{1}{\sqrt{2}} \beta \cdot d + z_2.$$

As shown in equations (19) and (20), the UE may obtain a channel power of either $|\alpha|^2/2$ or $|\beta|^2/2$ for the rank-1 transmission depending on whether the left or right column of the identity matrix is used for precoding. Thus, half of the total power of the two power amplifiers may be wasted by using one column of the identity matrix for precoding of the rank-1 transmission. The Fourier matrix may thus be preferred over the identity matrix for rank-1 transmission.

In a first design, three hypotheses may be supported for ranks 1 and 2 in 2×2 MIMO configuration, as follows:
  Use the identity matrix for rank 2, and
  Use either the first or second column of the Fourier matrix (or a phase-shifted Fourier matrix) for rank 1.

The first design may be used when the MIMO channel matrix H is near diagonal, e.g., due to high XPD for cross-polarization antenna configurations. This design may provide good performance for both the linear MMSE receiver and the MMSE-SIC receiver for both ranks 1 and 2 for near-diagonal MIMO channel matrix. This design may be used when precoding matrix information is not reported by the UE.

In a second design, four hypotheses may be supported for ranks 1 and 2 in 2×2 MIMO configuration, as follows:

Use either the identity matrix or the Fourier matrix (or a phase-shifted Fourier matrix) for rank 2, and Use either the first or second column of the Fourier matrix (or the phase-shifted Fourier matrix) for rank 1.

The second design may support both near-diagonal MIMO channel as well as far from diagonal MIMO channel. Both high XPD (near-diagonal MIMO channel) and low XPD (far from diagonal MIMO channel) may be dynamically observed even for cross-polarization antenna configurations depending on the antenna orientations, the channel propagations, etc. Furthermore, different UEs may be equipped with different antenna configurations, e.g., some UEs may be equipped with dipole antennas while other UEs may be equipped with cross-polarization antennas. By supporting both the identity matrix and the Fourier matrix for rank 2, good performance may be achieved for both the linear MMSE receiver and the MMSE-SIC receiver regardless of the XPD or the antenna configurations.

For the second design, a UE may select one of the four hypotheses based on a metric (e.g., sum throughput). The UE may report the selected hypothesis using two bits for feedback. The Node B may apply the preceding matrix corresponding to the selected hypothesis for data transmission to the UE.

For clarity, rank-dependent precoding has been described for 2×2 MIMO configuration. In general, rank-dependent precoding may be used for any R×T MIMO configuration and may support any number of different ranks. Each rank may be associated with a set of at least one precoding vector or matrix. For rank 1, the set may include at least one column vector of a unitary matrix, which may be a Fourier matrix, a phase-shifted Fourier matrix, or some other matrix. For rank 2, the set may include the identity matrix and possibly one or more unitary matrices. A set for a higher rank may include one or more matrices that can provide good performance for that rank. For example, a set for rank 4 may include a matrix that can provide good performance for dual cross-polarization antennas. The set for each rank may also include other matrices. The sets of precoding vectors/matrices for different ranks may be defined to provide good performance for both near-diagonal MIMO channel as well as far from diagonal MIMO channel.

In one design, the Node B may select the precoding matrix and not rely on reporting of precoding matrix information by the UE. The UE may select the rank, and the Node B may select the precoding matrix based on the selected rank. In another design, the UE may evaluate different possible precoding vectors/matrices for different ranks and may report the selected precoding vector/matrix and rank. The Node B may then apply the selected precoding vector/matrix.

As noted above, SC-FDM or OFDM may be used for transmission on a given link. A main motivation for choosing SC-FDM instead of OFDM for the uplink is that an SC-FDM waveform has a lower peak-to-average power ratio (PAR) than that of an OFDM waveform. The lower PAR may allow a power amplifier to be operated closer to peak power level (or at higher average power). SC-FDM may thus have an advantage over OFDM in power-limited scenarios, such as for cell-edge UEs, due to its more efficient utilization of the power amplifier.

However, UEs located close to the Node B or in isolated cells may achieve sufficiently high geometry to justify MIMO transmission. For 2×2 single-user MIMO (SU-MIMO), two streams may be transmitted by a UE equipped with two antennas and two power amplifiers. For 4×4 SU-MIMO, four streams may be transmitted by a UE equipped with four antennas and four power amplifiers. In either case, different streams may observe different channel conditions and may be reliably sent at different rates with different modulation and coding schemes (MCSs). The use of different modulation schemes for different streams may lead to different PARs for these streams. Furthermore, transmitter MIMO processing such as layer permutation and precoding may also impact the PARs of the streams.

Computer simulation was performed to determine the PARs of LFDM and OFDM waveforms for various MIMO schemes and modulation schemes for 2×2 MIMO configuration. The computer simulation was performed for the following MIMO schemes:

Per antenna rate control (PARC)—each stream is sent from one physical antenna without precoding or layer permutation, Layer permutation—each stream is sent across all antennas used for MIMO transmission, and Precoding (or virtual antenna mapping)—each stream is sent on one virtual antenna formed with one column of a precoding matrix.

PARC may be achieved by omitting layer permutation and performing precoding with the identity matrix. Layer permutation may be achieved by cycling through the antennas on different subcarriers and/or in different symbol periods. Layer permutation may allow a stream to observe an average signal-to-noise-and-interference ratio (SINR) for all antennas.

Two streams may be sent via two antennas based on one of the MIMO schemes. The computer simulation indicates that the PAR of an LFDM waveform is lower than the PAR of an OFDM waveform for all MIMO schemes and modulation schemes. For LFDM with PARC, the PAR for QPSK is lower than the PAR for 16-QAM, which is lower than the PAR for 64-QAM. For LFDM, the PAR of each output stream with layer permutation is between the PARs of the two output streams with PARC. Also for LFDM, the PARs of the output streams with precoding are higher than (i) the PARs of the output streams with layer permutation and (ii) the PARs of the output streams with PARC.

The following observations may be made:

For rank-1 transmission, it may be advantageous from PAR perspective to perform precoding with a unitary matrix in order to utilize all of the available power amplifiers.

If the number of streams is equal to the number of antennas, or L=T, then precoding with a unitary matrix may degrade performance due to PAR increase. Precoding with the identity matrix may provide lower PAR.

If the number of streams is less than the number of antennas, or L<T, then it may be advantageous to perform precoding with a unitary matrix in order to utilize all of the available power amplifiers.

Figures 5, 6:
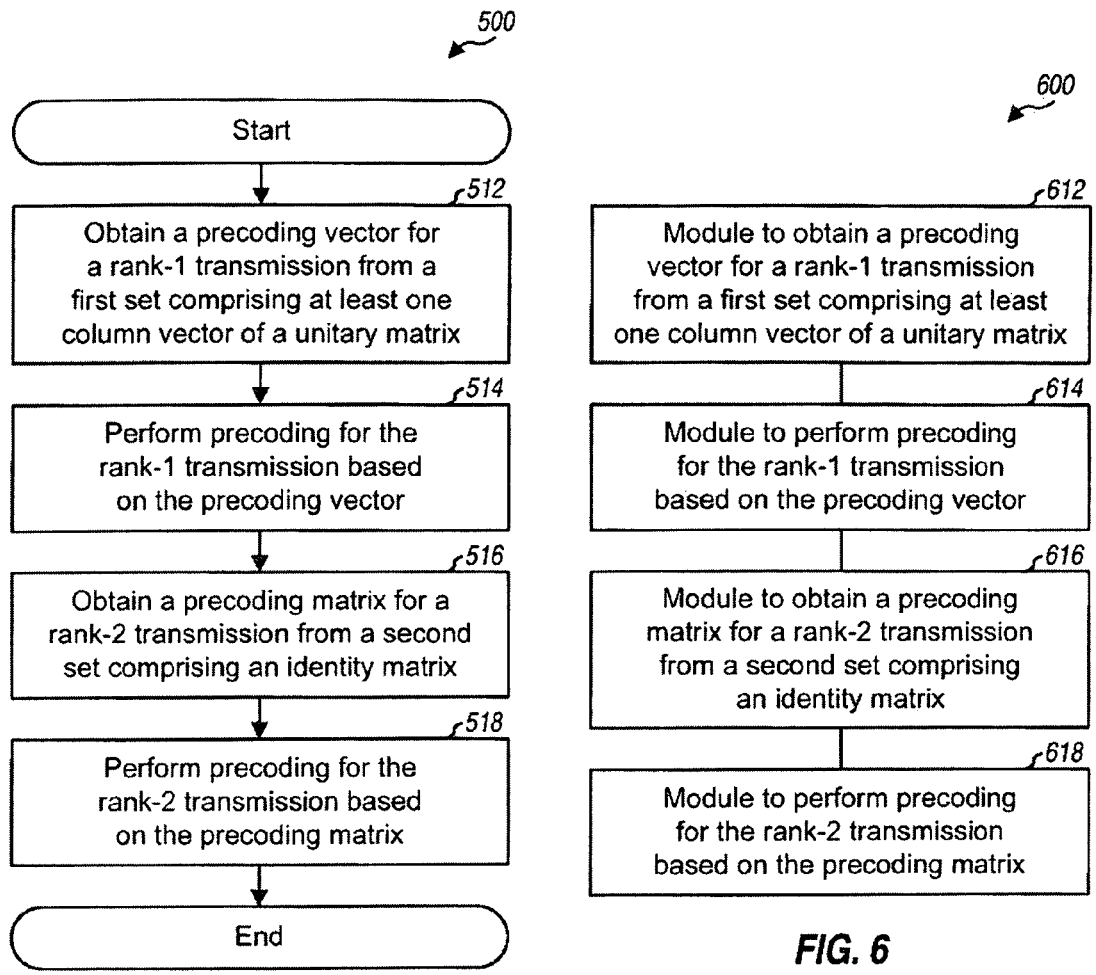
FIG. 5 shows a process for transmitting data with rank-dependent precoding.
FIG. 6 shows an apparatus for transmitting data with rank-dependent precoding.

FIG. 5 shows a design of a process 500 for transmitting data with rank-dependent precoding. Process 500 may be performed by a transmitter, which may be a Node B for downlink transmission or a UE for uplink transmission.

The transmitter may obtain a precoding vector for a rank-1 transmission from a first set comprising at least one column vector of a unitary matrix (block 512). The unitary matrix may be a Fourier matrix, a phase-shifted Fourier matrix, or some other type of unitary matrix. The transmitter may perform precoding for the rank-1 transmission based on the precoding vector (block 514). The transmitter may obtain a precoding matrix for a rank-2 transmission from a second set comprising an identity matrix (block 516). The transmitter may perform precoding for the rank-2 transmission based on the precoding matrix (block 518).

For block 514, the transmitter may perform precoding for one data stream with the precoding vector to obtain multiple output streams for multiple transmit antennas. For block 518, the transmitter may perform precoding for two data streams with the precoding matrix to obtain multiple output streams for the multiple transmit antennas.

In one design of block 516, the transmitter may determine whether a MIMO channel resembles a diagonal channel having a near-diagonal channel response matrix with small channel gains off the diagonal. This determination may be based on (i) antenna configurations at the Node B and the UE, (ii) a MIMO channel estimate obtained by the receiver, and/or (iii) some other information. The transmitter may select the identity matrix as the precoding matrix for the rank-2 transmission if the MIMO channel resembles a diagonal channel. For example, the transmitter may select the identity matrix if the Node B and/or the UE are equipped with cross-polarization antennas. The second set may further comprise the unitary matrix. The transmitter may select the unitary matrix as the precoding matrix for the rank-2 transmission if the MIMO channel does not resemble a diagonal channel.

In one design, the transmitter may select the identity matrix as a precoding matrix for a rank-L transmission if L is equal to the number of transmit antennas. The transmitter may then perform precoding for the rank-L transmission based on the identity matrix. The transmitter may select a unitary matrix as the precoding matrix for the rank-L transmission if L is less than the number of transmit antennas. The transmitter may then perform precoding for the rank-L transmission based on the unitary matrix.

The transmitter may select the precoding vector for the rank-1 transmission and the precoding matrix for the rank-2 transmission. Alternatively, the transmitter may receive the precoding vector and/or the precoding matrix from the receiver. The receiver may evaluate different possible precoding vectors in the first set and different possible matrices in the second set. The receiver may then send the precoding vector and matrix with the best performance to the transmitter.

FIG. 6 shows a design of an apparatus 600 for transmitting data with rank-dependent precoding. Apparatus 600 includes means for obtaining a precoding vector for a rank-1 transmission from a first set comprising at least one column vector of a unitary matrix (module 612), means for performing precoding for the rank-1 transmission based on the precoding vector (module 614), means for obtaining a precoding matrix for a rank-2 transmission from a second set comprising an identity matrix (module 616), and means for performing precoding for the rank-2 transmission based on the precoding matrix (module 618).

Figures 7, 8:
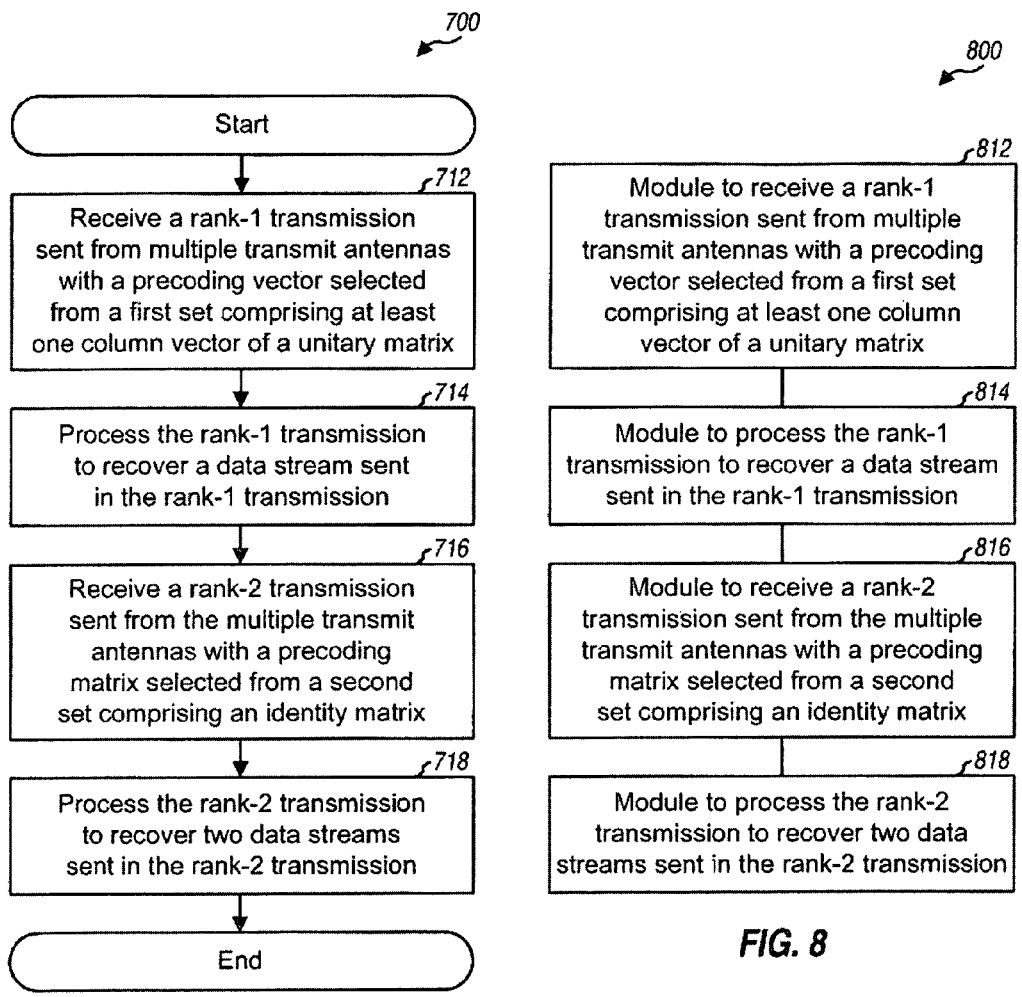
FIG. 7 shows a process for receiving data with rank-dependent precoding.
FIG. 8 shows an apparatus for receiving data with rank-dependent precoding.

FIG. 7 shows a design of a process 700 for receiving data with rank-dependent precoding. Process 700 may be performed by a receiver, which may be a UE for downlink transmission or a Node B for uplink transmission.

The receiver may receive a rank-1 transmission sent from multiple transmit antennas with a precoding vector selected from a first set comprising at least one column vector of a unitary matrix (block 712). The receiver may process the rank-1 transmission to recover a data stream sent in the rank-1 transmission (block 714). The receiver may receive a rank-2 transmission sent from the multiple transmit antennas with a precoding matrix selected from a second set comprising an identity matrix (block 716). The receiver may process the rank-2 transmission to recover two data streams sent in the rank-2 transmission (block 718).

For block 714, the receiver may derive a spatial filter vector for the rank-1 transmission based on the precoding vector. The receiver may then perform detection for the rank-1 transmission based on the spatial filter vector. For block 718, the receiver may derive a spatial filter matrix for the rank-2 transmission based on the precoding matrix. The receiver may then perform MIMO detection for the rank-2 transmission based on the spatial filter matrix. The receiver may perform MMSE detection or MMSE-SIC detection for the rank-2 transmission.

In one design, the receiver may evaluate at least one vector in the first set and at least one matrix in the second set based on a metric, e.g., sum throughput. The receiver may select a vector or a matrix with the best metric, e.g., the highest sum throughput. The receiver may send feedback information comprising the selected vector or matrix to the transmitter.

FIG. 8 shows a design of an apparatus 800 for receiving data with rank-dependent precoding. Apparatus 800 includes means for receiving a rank-1 transmission sent from multiple transmit antennas with a precoding vector selected from a first set comprising at least one column vector of a unitary matrix (module 812), means for processing the rank-1 transmission to recover a data stream sent in the rank-1 transmission (module 814), means for receiving a rank-2 transmission sent from the multiple transmit antennas with a precoding matrix selected from a second set comprising an identity matrix (module 816), and means for process the rank-2 transmission to recover two data streams sent in the rank-2 transmission (module 818).

The modules in FIGS. 6 and 8 may comprise processors, electronics devices, hardware devices, electronics components, logical circuits, memories, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
at least one processor configured to obtain a precoding vector for a rank-1 transmission from a first set comprising at least one column vector of a unitary matrix, to perform precoding for the rank-1 transmission based on the precoding vector, to obtain a precoding matrix for a rank-2 transmission from a second set comprising an identity matrix, and to perform precoding for the rank-2 transmission based on the precoding matrix; and
a memory coupled to the at least one processor.

2. The apparatus of claim 1, wherein the unitary matrix is a Fourier matrix or a phase-shifted Fourier matrix.

3. The apparatus of claim 1, wherein the at least one processor is configured to determine whether a multiple-input multiple-output (MIMO) channel resembles a diagonal channel, and to select the identity matrix as the precoding matrix for the rank-2 transmission when the MIMO channel resembles a diagonal channel.

4. The apparatus of claim 3, wherein the second set further comprises the unitary matrix, and wherein the at least one processor is configured to select the unitary matrix as the precoding matrix for the rank-2 transmission when the MIMO channel does not resemble a diagonal channel.

5. The apparatus of claim 3, wherein the at least one processor is configured to determine whether the MIMO channel resembles a diagonal channel based on antenna configurations at a Node B and a user equipment (UE).

6. The apparatus of claim 1, wherein the at least one processor is configured to select the identity matrix as the precoding matrix for the rank-2 transmission when a Node B is equipped with cross-polarization antennas.

7. The apparatus of claim 1, wherein the at least one processor is configured to select the identity matrix as the precoding matrix for the rank-2 transmission when a Node B and a user equipment (UE) are equipped with cross-polarization antennas.

8. The apparatus of claim 1, wherein the at least one processor is configured to select an identity matrix as a precoding matrix for a rank-L transmission when L is equal to number of transmit antennas, where L is one or greater, and to perform precoding for the rank-L transmission based on the identity matrix.

9. The apparatus of claim 1, wherein the at least one processor is configured to select a unitary matrix as a precoding matrix for a rank-L transmission when L is less than number of transmit antennas, where L is one or greater, and to perform precoding for the rank-L transmission based on the unitary matrix.

10. The apparatus of claim 1, wherein the at least one processor is configured to perform precoding for one data stream with the precoding vector to obtain multiple output streams for multiple transmit antennas for the rank-1 transmission, and to perform precoding for two data streams with the precoding matrix to obtain multiple output streams for the multiple transmit antennas for the rank-2 transmission.

11. A method for wireless communication, comprising:
obtaining a precoding vector for a rank-1 transmission from a first set comprising at least one column vector of a unitary matrix;
performing precoding for the rank-1 transmission based on the precoding vector;
obtaining a precoding matrix for a rank-2 transmission from a second set comprising an identity matrix; and
performing precoding for the rank-2 transmission based on the precoding matrix, wherein the obtaining the precoding vector, the performing precoding for the rank-1 transmission, the obtaining the precoding matrix, and the performing precoding for the rank-2 transmission are performed by at least one processor.

12. The method of claim 11, wherein the obtaining the precoding matrix comprises
    determining whether a multiple-input multiple-output (MIMO) channel resembles a diagonal channel, and
    selecting the identity matrix as the precoding matrix for the rank-2 transmission when the MIMO channel resembles a diagonal channel.

13. The method of claim 12, wherein the second set further comprises the unitary matrix, and wherein the obtaining the precoding matrix further comprises selecting the unitary matrix as the precoding matrix for the rank-2 transmission when the MIMO channel does not resemble a diagonal channel.

14. The method of claim 11, wherein the obtaining the precoding matrix comprises selecting the identity matrix as the precoding matrix for the rank-2 transmission when a Node B is equipped with cross-polarization antennas.

15. An apparatus for wireless communication, comprising:
    means for obtaining a precoding vector for a rank-1 transmission from a first set comprising at least one column vector of a unitary matrix;
    means for performing precoding for the rank-1 transmission based on the precoding vector;
    means for obtaining a precoding matrix for a rank-2 transmission from a second set comprising an identity matrix; and
    means for performing precoding for the rank-2 transmission based on the precoding matrix, wherein the means for obtaining the precoding vector, the means for performing precoding for the rank-1 transmission, the means for obtaining the precoding matrix, and the means for performing precoding for the rank-2 transmission comprise at least one processor.

16. The apparatus of claim 15, wherein the means for obtaining the precoding matrix comprises
    means for determining whether a multiple-input multiple-output (MIMO) channel resembles a diagonal channel, and
    means for selecting the identity matrix as the precoding matrix for the rank-2 transmission when the MIMO channel resembles a diagonal channel.

17. The apparatus of claim 16, wherein the second set further comprises the unitary matrix, and wherein the means for obtaining the precoding matrix further comprises means for selecting the unitary matrix as the precoding matrix for the rank-2 transmission when the MIMO channel does not resemble a diagonal channel.

18. The apparatus of claim 15, wherein the means for obtaining the precoding matrix comprises means for selecting the identity matrix as the precoding matrix for the rank-2 transmission when a Node B is equipped with cross-polarization antennas.

19. A non-transitory machine-readable medium comprising instructions which, when executed by a machine, cause the machine to perform operations including:
    obtaining a precoding vector for a rank-1 transmission from a first set comprising at least one column vector of a unitary matrix;
    performing precoding for the rank-1 transmission based on the precoding vector;
    obtaining a precoding matrix for a rank-2 transmission from a second set comprising an identity matrix; and
    performing precoding for the rank-2 transmission based on the precoding matrix.

20. The non-transitory machine-readable medium of claim 19 which, when executed by the machine, cause the machine to perform operations further including:
    determining whether a multiple-input multiple-output (MIMO) channel resembles a diagonal channel; and
    selecting the identity matrix as the precoding matrix for the rank-2 transmission when the MIMO channel resembles a diagonal channel.

21. The non-transitory machine-readable medium of claim 20 which, when executed by the machine, cause the machine to perform operations further including:
    selecting a unitary matrix in the second set as the precoding matrix for the rank-2 transmission when the MIMO channel does not resemble a diagonal channel.

22. The non-transitory machine-readable medium of claim 19 which, when executed by the machine, cause the machine to perform operations further including:
    selecting the identity matrix as the precoding matrix for the rank-2 transmission when a Node B is equipped with cross-polarization antennas.

* * * * *